Aug. 20, 1968  B. F. KAUFMAN, JR., ET AL  3,398,222
METHOD OF MAKING A PLASTIC AND RUBBER WHEEL
Filed Sept. 30, 1965  2 Sheets-Sheet 1
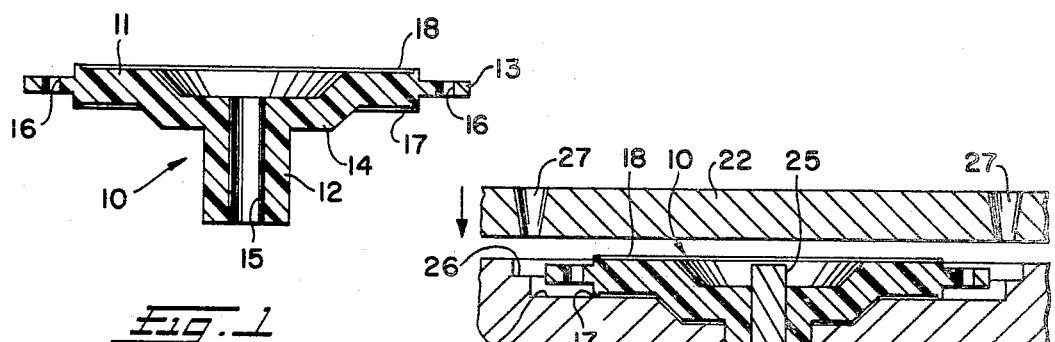
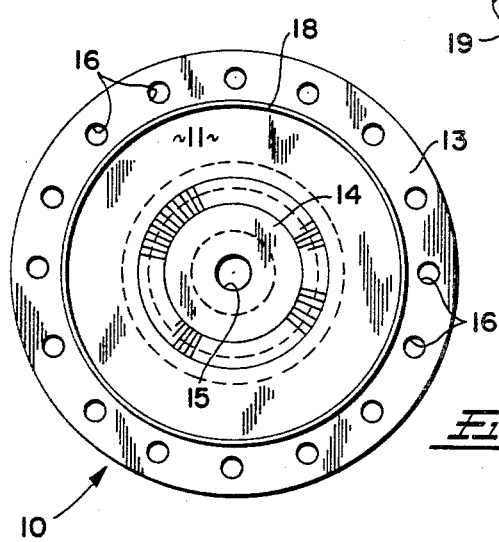
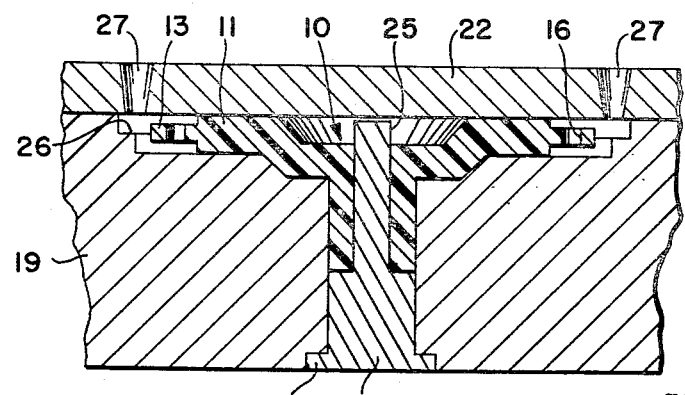
INVENTORS
RAYMOND R. MONG
BRUCE F. KAUFMAN, JR.
BY *Oberlin, Maky & Donnelly*
ATTORNEYS Aug. 20, 1968　　B. F. KAUFMAN, JR., ET AL　　3,398,222
METHOD OF MAKING A PLASTIC AND RUBBER WHEEL
Filed Sept. 30, 1965　　　　　　　　　　　　　　2 Sheets-Sheet 2

INVENTORS
RAYMOND R. MONG
BRUCE F. KAUFMAN, JR.

BY *Oberlin, Maky & Donnelly*
ATTORNEYS

United States Patent Office 3,398,222
Patented Aug. 20, 1968

3,398,222
METHOD OF MAKING A PLASTIC AND RUBBER WHEEL
Bruce F. Kaufman, Jr., Tallmadge, and Raymond R. Mong, Northfield Center, Ohio, assignors to Industrial Electronic Rubber Company, Twinsburg, Ohio, a corporation of Ohio
Filed Sept. 30, 1965, Ser. No. 491,609
5 Claims. (Cl. 264—250)

ABSTRACT OF THE DISCLOSURE

The method of making a wheel by molding a continuous rubber body to a rigid plastic body having a right cylindrical portion, the plastic body being formed with continuous annular beads respectively adjacent to the edges of said cylindrical portion and projecting beyond the facers of the same, with the beads being substantially completely crushed by closure of the mold about the plastic body and providing an interior seal for the annular cavity defined by the mold and the cylindrical plastic portion.

---

The present invention relates to the method of making a composite plastic and rubber wheel and has for a primary object the provision of a method of making an idler or drive wheel of such combination nature for record turntables and the like.

This type of idler or drive wheel has heretofore been made by molding rubber to and about a metal washer and attaching a sleeve bearing to the washer as a hub for support of the wheel. The bearing is usually made of powdered metal and impregnated with oil or another lubricant; and the attachment to the metal washer or stamping is generally accomplished by staking the bearing in the opening after molding of the rubber to the washer. The conventional design thus utilizes three components for assembly and these are of different materials, a circumstance which further adds to the cost of manufacturing the article. Moreover, the attachment of the bearing by pressing and staking the same in the washer necessarily after the rubber has been molded presents problems of maintaining concentricity of the inner surface of the bearing and the outer periphery of the rubber at which the wheel is engaged with the turntable, and this relationship must be closely maintained for proper performance of the wheel.

The present invention has, accordingly, as further objects the provision of: a method of making a plastic and rubber wheel of simpler and improved mechanical design for such an application; a design for this wheel which is less susceptible to failure; elimination of any problem in providing concentricity between the outer rubber periphery and the internal surface of the bearing hub in such a wheel; and substantial savings in the cost of manufacture of such product.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a cross-sectional view of the plastic part of the new wheel;

FIG. 2 is a top plan view of such plastic part;

FIG. 3 shows the plastic part in a fragmented mold assembly, in cross-section, with the mold not fully closed;

FIG. 4 is a view similar to FIG. 3 but showing the mold as fully closed for the molding of rubber to the plastic part;

Figure 5:
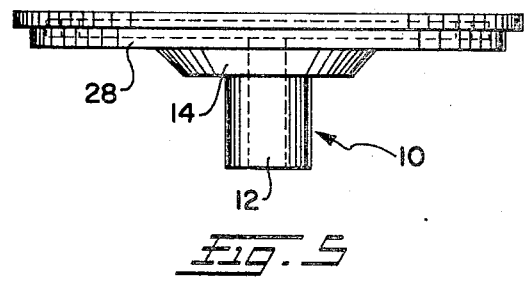
FIG. 5 is an elevational view of a completed plastic and rubber wheel.

Referring now to the drawings in details, reference numeral 10 designates generally a molded plastic part which is one of the two components of the new plastic and rubber wheel. This part 10 is formed with a disc body 11, a central cylindrical hub extension 12, and a section 13 of reduced thickness projecting outwardly uniformly about the periphery of the body. The body 11 has a depressed central portion 14 from which the cylindrical extension projects, and a bore 15 is provided through the extension and body on the axis of the part. The relatively thin peripheral section 13 is in a plane perperpendicular to the axis and intermediate the inner and outer faces or surfaces of the body as ilustrated, and this section is provided with a plurality of spaced holes 16 through the thickness thereof for purpose to be later described.

The plastic part 10 is also formed with small beads 17 and 18 respectively at the opposite sides of the body 11. Moreover, these beads are at the edges of the body and, as shown, form small annular extensions of the body at its cylindrical wall or periphery.

In the production of the new wheel, the plastic part 10 is placed in a suitable rubber mold of the configuration shown in somewhat simplified form in FIGS. 3 and 4. This mold is shown as comprising a body plate 19 having a bore 20 and a communicating upper face relief 21 which together with a mold cover plate 22 defines a cavity for the molding of rubber to the plastic part within the mold assembly. An insert 23 is positioned in the bore of the body plate 19 to extend from the lower face thereof into the mold cavity, this insert being cylindrical, with an outer or lower end locating flange 24 against a shoulder in the mold plate 19 and an inner end extension formed as a pin 25 of reduced diameter. This insert is precisely machined, particularly the pin 25 which serves as a sizing as well as a locating member in the molding operation.

The mold relief will be seen to conform to the body portion of the plastic part 10 and the hub 12 fits over the insert pin 25. However, the cavity is of significantly greater diameter than the body of the plastic part, including its reduced peripheral section 13, and the vertical wall of the cavity is stepped as shown at 26.

When the plastic part 10 is placed in the mold body plate 19, it will rest therein on the small bead 17 at its underside, as shown in FIG. 3, and the uppermost bead 18 projects slightly above the top surface of this mold plate. When the cover 22 is forcibly applied to close the mold, in any suitable press, the beads 17 and 18 are crushed, with this condition shown in FIG. 4 in which the beads are not discernible. This substantially complete mashing of the beads assists in holding the plastic part securely in place while rubber is injected into the mold through a plurality of sprue holes 27 in the cover, and the beads further insure that the cavity is sealed at the peripheral edges of the disc body 11 against inward flow of the rubber over the faces thereof. Such sealing thus eliminates any flash requiring subsequently to be trimmed, and the firm holding of the plastic part during the rubber molding operation at the periphery is extremely beneficial in providing the desired concentricity of the inside and outside diameters. As earlier noted, the pin 25 in the cavity is used for sizing of the hub bore, with the pressure and heat of the rubber molding operation effective to produce some deformation or flow as might be needed for this purpose.

Figure 6:
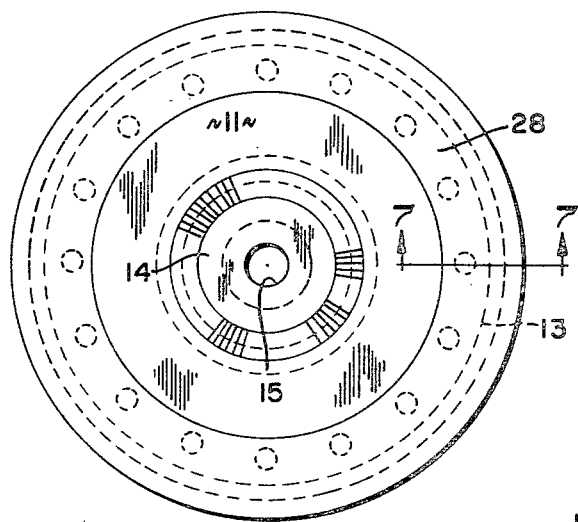
FIG. 6 is a top plan view of the finished wheel.
Figure 7:
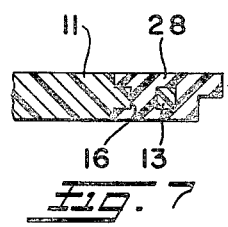
FIG. 7 is a fragmented cross-sectional view indicated by the line 7—7 in FIG. 6 and to an enlarged scale.

The conditions for rubber molding are entirely conventional, and it will be apparent that the rubber will flow through the holes 16 in the peripheral section 13 of the plastic part to provide permanent locking of the rubber body to this part. The finished wheel is illustrated in FIGS. 5 and 6, and it will be seen that the rubber body 28 is in the form of a continuous band about the plastic part 10, with a cylindrical stepped periphery for frictional engagement with the record turntable and the like in order to stabilize or drive the same. The enlarged scale section of FIG. 7 shows more clearly the manner in which the rubber is locked to the plastic part.

Figure 8:
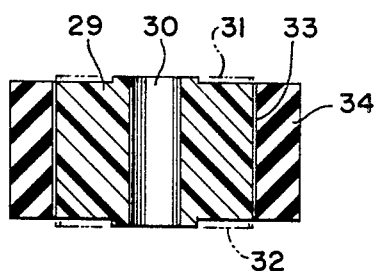
FIG. 8 is a transverse cross-section of a modified form of the new wheel.

The modified wheel illustrated in FIG. 8 comprises a rigid plastic body 29 which is molded in the same manner but to a different shape. This body 29 is thus substantially entirely of right cylindrical form as molded, with an axial bore 30 and crush beads 31 and 32 respectively at the faces or ends of the body 29. The crush beads are indicated by dashed lines, since the illustration is of the wheel in its finished form and the beads have, of course, been completely mashed or crushed in the rubber mold, the bore 30 also being sized in this mold as above described. In lieu of a peripheral locking ring as in the first embodiment of the wheel, the periphery of the plastic body 29 is coated with a suitable cement 33 for the bonding or locking of the rubber body 34 in the molding of the same about the plastic body.

It will be apparent that the particular plastic employed should be capable of withstanding the conditions of the rubber molding step without being distorted, and it is generally preferred to use a thermosetting resin for this reason. However, if a thermoplastic resin is available which is otherwise suitable and can experience the heat of the rubber molding operation without adverse effect, then it might be used as well as for this part. Among the thermosetting resins, the phenolic compounds have been satisfactorily employed, with a more specific example being the phenolic molding compound "Plenco," CR118-A, supplied by Plastics Engineering Company of Sheboygan, Wis. It is also preferred to add a quantity of a filler such as graphite to act as a lubricant.

The plastic part of the new wheel or roller has very low wear characteristics and it provides both the support body for the rubber and the bearing hub in a single piece. There is no danger of corrosion and, in the drive wheel form, the possibility of physical failure at the joint between the conventional washer and bearing is also eliminated. The new design is, furthermore, particularly improved in respect of maintaining concentricity, with the sizing of the hub bore and firm gripping of the disc body at the periphery thereof cooperably insuring that the band of rubber will be concentric with the inside diameter of the hub portion. Only two molding operations are required for the production of the new wheel and these can be readily accomplished in accordance with well-known techniques and apparatus.

Other modes of applying the principle of the invention may be employed, change being made as regards the details described, provided the features stated in any of the following claims or the equivalent of such be employed.

We, therefore, particularly point out and distinctly claim as our invention:

1. The method of making a wheel which comprises the steps of: forming by molding a rigid plastic body having a right cylindrical portion including opposed end faces, the plastic body being further provided in the molding thereof with continuous annular beads respectively adjacent the edges of said cylindrical portion and projecting slightly beyond said end faces; placing said plastic body in a rubber mold and by closure of the mold crushing substantially completely the beads thereof so that said end faces at said edges are substantially flat, the mold defining an annular cavity about the edge of the cylindrical plastic portion which is interiorly sealed by the crushed beads; and molding a continuous rubber body to the plastic part in said cavity.

2. The method set forth in claim 1, wherein an axial bore is formed in the plastic part, and said bore is sized to desired diameter in the rubber mold, the wall of the annular mold cavity being concentric with the thus sized bore.

3. The method set forth in claim 2, wherein said plastic body is molded from a synthetic resin compound containing a lubricating additive.

4. The method set forth in claim 2, wherein said plastic body is molded from a phenolic molding compound.

5. The method set forth in claim 4, wherein the phenolic molding compound contains a lubricating additive.

References Cited
UNITED STATES PATENTS

| | | | |
|---|---|---|---|
| 1,589,913 | 6/1926 | Wells | 264—266 X |
| 2,851,731 | 9/1958 | Gits et al. | 264—247 |
| 3,061,887 | 11/1962 | Clarke | 264—242 X |

ROBERT E. WHITE, *Primary Examiner.*

J. H. SILBAUGH, *Assistant Examiner.*